United States Patent [19]

Sparks

[11] 4,378,215
[45] Mar. 29, 1983

[54] EDUCATIONAL DEVICE ESPECIALLY FOR THE BLIND AND THE BLIND-DEAF

[76] Inventor: William B. Sparks, 3413 Kinnamon Rd., Winston-Salem, N.C. 27104

[21] Appl. No.: 272,514

[22] Filed: Jun. 11, 1981

[51] Int. Cl.³ .................................................. G09B 21/04
[52] U.S. Cl. ........................................ 434/113; 428/13; 428/15; D11/104; D18/27
[58] Field of Search ............... 434/112, 113, 114, 159, 434/172

[56] References Cited

U.S. PATENT DOCUMENTS

| | | |
|---|---|---|
| D. 47,781 | 9/1915 | Carson . |
| D. 260,626 | 9/1981 | Kadar . |
| 1,962,687 | 6/1934 | Hodge ................................. 434/112 |
| 2,972,140 | 2/1961 | Hirsch ............................ 434/113 X |
| 3,831,296 | 8/1974 | Hagle .................................. 434/112 |
| 4,006,541 | 2/1977 | Miller ................................. 434/172 |
| 4,074,444 | 2/1978 | Laenger, Sr. et al. .............. 434/112 |
| 4,215,490 | 8/1980 | Fewell ................................ 434/114 |
| 4,260,574 | 4/1981 | Macomson ...................... 428/15 X |

FOREIGN PATENT DOCUMENTS

| | | |
|---|---|---|
| 527868 | 7/1955 | Italy .................................... 434/112 |
| 770243 | 3/1957 | United Kingdom ................ 434/113 |
| 1581453 | 12/1980 | United Kingdom ................ 434/112 |

OTHER PUBLICATIONS

Webster's Collegiate Dictionary, Seventh Edition, © 1967, p. 101.
Popular Mechanics, Jun. 1979, p. 90.
European Jeweler, p. 1, 2-1-77.
"Let's Talk", Single Hand Alphabet of the Deaf, 1 p.

Primary Examiner—William H. Grieb
Attorney, Agent, or Firm—Wigman & Cohen

[57] ABSTRACT

An educational device for teaching or self-teaching the manual alphabet of the deaf to anyone, especially to the blind and/or deaf and for communicating among such persons is disclosed. A plurality of three-dimensional, actual size cast or molded figures of the human hand mounted on a base and each formed in a respective letter of the manual alphabet comprise an instructional kit for teaching the manual alphabet. Each hand figure is provided thereon with embossments of the Braille character and, preferably, the English alphabet letter corresponding to the manual alphabet letter represented by such figure. Another embodiment comprises statues or figures of human beings depicted in various poses communicating with each other by sign language with Braille characters and English alphabet letters affixed on the pedestal of the statues.

9 Claims, 3 Drawing Figures

EDUCATIONAL DEVICE ESPECIALLY FOR THE BLIND AND THE BLIND-DEAF

BACKGROUND OF THE INVENTION

The present invention relates to education and more particularly to educational devices for teaching or self-teaching the manual alphabet of the deaf to those who are blind, deaf, blind-deaf and to those with normal sight and hearing, as well as for teaching and communicating feelings, concepts and ideas to and among such persons.

A search of the art relating to such educational devices failed to uncover any prior art reference which discloses the educational device of the present invention. A number of references were uncovered which disclose a variety of simple, as well as complex, teaching and communicating aids for the blind and/or deaf. The following is a listing of patents and publications uncovered during the aforementioned search:

| U.S. Pat. No. | Patentee | Issue Year |
|---|---|---|
| 1,962,687 | Hodge | 1934 |
| 2,972,140 | Hirsch | 1961 |
| 3,831,296 | Hagle | 1974 |
| 4,074,444 | Laenger, Sr. et al | 1978 |
| 4,215,490 | Fewell | 1980 |

British Pat. No. 770,243
Popular Machanics, June 1979, page 90.

U.S. Pat. No. 1,962,687 to Hodge discloses a communication chart for use by a person to instruct others in the manual alphabet of the deaf. The chart comprises a sheet of flexible material upon which is displayed all the letters of the English alphabet. Flexible tabs are superposed over each letter on the chart and are adapted to be lifted up to expose the underlying letter. The underside of each flexible tab is provided with an illustration of the manual alphabet sign corresponding to the respective underlying English letter.

U.S. Pat. No. 4,074,444 to Laenger, Sr. et al discloses a method and apparatus for communicating with the blind-deaf by means of a movable anthropomorphic, electromechanical hand which is electronically programmed to form letters of the one-hand manual alphabet. The electromechanical hand is controlled by an electronic buffer which converts intelligence signals from an electric typewriter or teletype machine to a code which causes mechanical motion of the hand to a programmed position corresponding to a character of the one-hand manual alphabet.

At page 90 of the aforementioned *Popular Mechanics* publication of June 1979, there is disclosed a variation of a device commonly known in the art as a "talking glove." Upon the palm-side of the glove, the letters of the English alphabet are displayed and, located adjacent each alphabet letter, is the Braille representation of that letter. The device is said to be useful to the "average" person, presumably, a hearing and sighted person, as a substitute for sign language communication.

One of the greatest barriers to communication between people is the inherent communication barrier between the blind and the deaf, and especially between the deaf and the blind-deaf. As the aforementioned references demonstrate, prior developments in the educational field have been virtually unresponsive to the need for teaching techniques of communication between deaf or hearing impaired individuals and blind or sight impaired individuals. Heretofore, the prior art has focused upon and sought to improve communication techniques, including face-to-face conversational communication, either between deaf persons or between normally sighted and hearing persons and the blind and/or deaf. Thus, the educational and communication devices of the prior art are neither suitable nor readily adapted for two-way, non-oral communications between the blind and the deaf, especially between the deaf and the blind-deaf.

In addition, the prior art education devices for teaching the manual alphabet, even to the deaf and to sighted and hearing persons, are in the form of two-dimensional illustrations on charts and posters, such as that shown in the aforementioned U.S. Pat. No. 1,962,687 to Hodge. For many individuals, including sighted and hearing persons, it is difficult to position the hand and physically duplicate the characters of the manual alphabet merely by viewing two-dimensional illustrations. Such difficulties tend to discourage sighted persons from self-educating themselves in the manual alphabet.

SUMMARY AND OBJECTS OF THE INVENTION

In view of the foregoing limitations and shortcomings of the prior art devices, as well as other disadvantages not specifically mentioned above, it should be apparent that there still exists a need in the art for an educational device for both teaching and self-teaching the manual alphabet to those who are blind, deaf, blind-deaf and to those with normal sight and hearing. It is, therefore, a primary objective of this invention to fulfill that need by providing a simple and inexpensive, yet highly effective, educational device for teaching the manual alphabet to all persons, especially to blind and blind-deaf persons.

More particularly, it is an object of this invention to provide an educational device comprising a plurality of individual, three-dimensional cast or molded figures, each of which represents, in substantially actual or life-size, a human hand formed in a respective letter or character of the manual alphabet, each of said figures having affixed or displayed thereon the Braille character corresponding to the manual alphabet character represented thereby.

It is another object of this invention to provide an educational device for teaching concepts and ideas to the deaf, blind and blind-deaf by means of cast or sculpted figures or figurines of humans depicted in the act of conveying words, concepts or ideas by a combination of the body position of the figures and the hands of the figures formed in sign language.

Still another important object of the present invention is to provide an educational device which makes it possible for the blind and blind-deaf to teach themselves the manual alphabet without the need for an instructor.

Briefly described, the aforementioned objects are accomplished according to the invention by providing a plurality of cast, molded, sculpted or carved statuettes or figures representing the human hand from the wrist or forearm area, said plurality including at least human hand statuettes representing all the letters of the manuel alphabet of the deaf. The plurality of statuettes may also include hand figures of other characters, words and symbology of the deaf represented by one or both hands. Each statuette is provided with a base or pedestal upon which the hand figure or statuette is mounted, preferably in the position which corresponds to the normal position of the human hand when forming the respective letter of the manual alphabet.

Each statuette is provided thereon, in relief, embossment or other suitable means of affixation, with the Braille symbol or character of raised dots which corresponds with the particular manual alphabet letter represented. Such embossed Braille characters are preferably located on the wrist area of each hand figure, but may be located elsewhere on the statuette, such as, for example, on the pedestal or base thereof.

On the pedestal of each statuette, at a location preferably visible when the statuette is viewed from the usual frontal location, is a representation of the English alphabet letter corresponding to the manual alphabet letter depicted by the statuette. Such letter representation is likewise preferably embossed; however, it need not be embossed and may be, for example, either a painted-on or glued-on illustration, a decal or a similar two-dimensional representation. The English alphabet letter representation advantageously makes possible the additional use of the educational device of the present invention in the instruction of sighted persons in the manual alphabet of the deaf, as well as the Braille symbology of the blind.

Other embodiments of the invention contemplate statues or statuettes comprising a figurine or combinations of figurines of human beings, especially small children, in the act of using the manual alphabet or sign language and in combination with the Braille characters, to convey a word, concept or idea. To further enhance communications with the deaf, the blind and the blind-deaf with such figurines, the human figure(s) may be depicted with facial expressions and/or in poses, positions or acts which aid in conveying the word, concept or idea.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF THE PREFERRED EMBODIMENT

Figure 1:
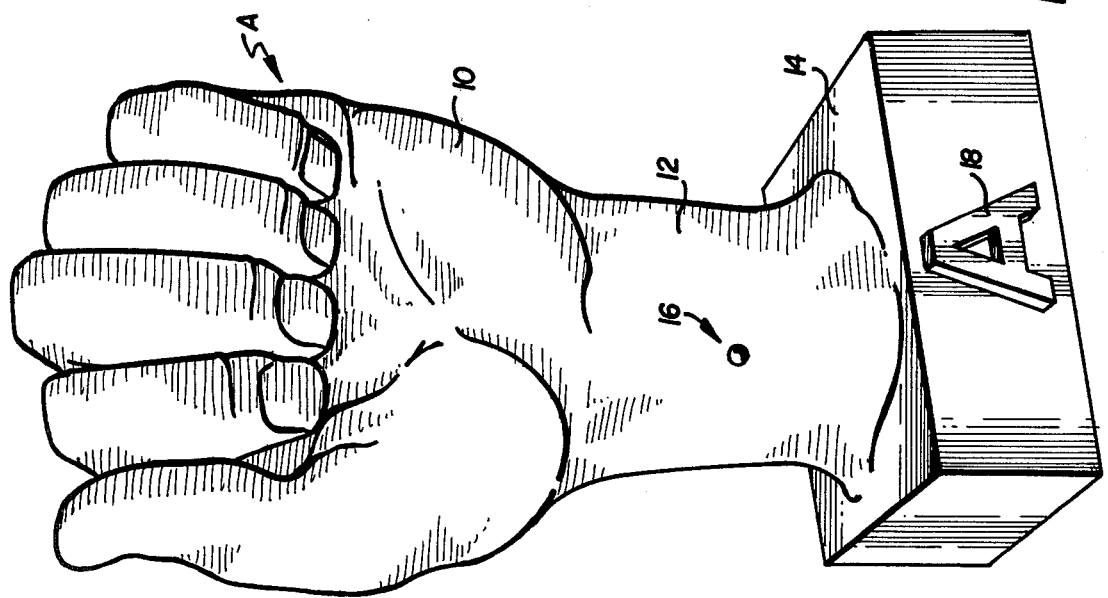
FIG. 1 is a perspective view of a three-dimensional statuette or figure of a human hand formed in the manual alphabet letter A with the Braille character A embossed thereon according to the invention.

Referring now to the drawings, there is illustrated in FIG. 1 a three-dimensional statuette designated generally by the letter A and representing a human hand figure 10 formed in the manual alphabet letter A. The hand figure 10 is mounted at the wrist portion 12 thereof in an upstanding position on a rectangular pedestal or base 14. Preferably, the figure 10 is formed as an actual or life-size representation of a human hand. Forming the hand figure in actual size facilitates the ability of a blind person to manually perceive or feel and correlate the position of the hand and fingers of the figure with the position of the hand and fingers of a human being formed in the same manual alphabet letter A, for instance.

On the wrist portion 12 of the figure 10, there is affixed or integrally formed an embossment 16 of raised dots positioned to symbolize the Braille alphabet letter A. On the front portion of the base 14 of the figure, there is provided another embossment 18 of a raised letter A. Instead of the embossment 18, the letter A may be affixed to the base 14 as a two-dimensional illustration, such as a decal.

It should be understood that the positions of the embossment 16, 18 on the statuette A may vary from those illustrated and may be located in a particular position depending on a specific instructional application. For example, both the Braille and English letter embossments 16, 18 may be located in a recess (not shown) on the underside of the base 14 to conceal the letter identification of the hand figure for testing purposes. The English letter embossment 18 may be located at the rear side of the base 14 for the testing of sighted persons. Other variations of the location of the Braille and English alphabet letter locations will be apparent to those skilled in the art in light of the foregoing description.

Figure 2:
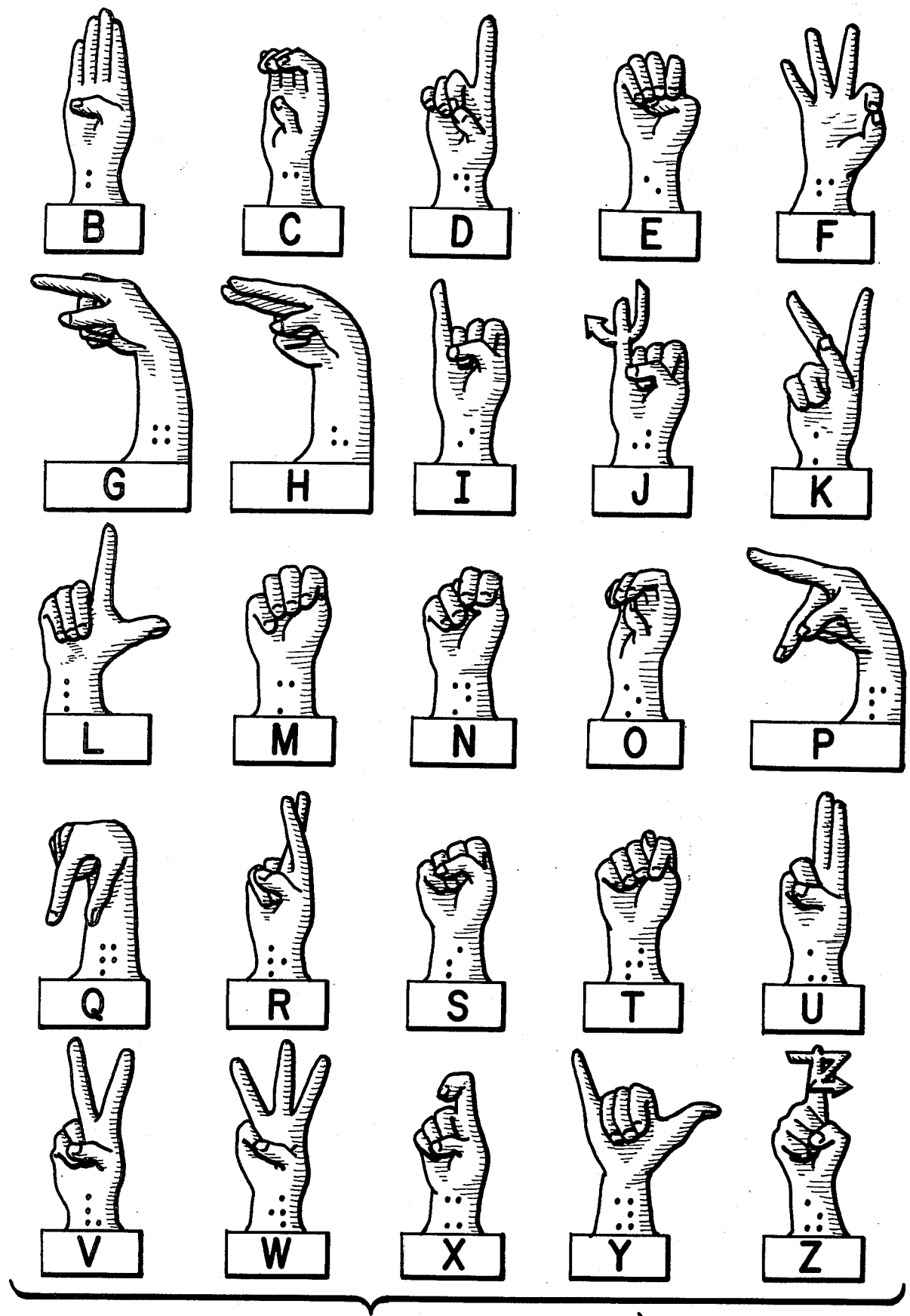
FIG. 2 illustrates, in perspective view, a plurality of three-dimensional human hand figures representing the manual alphabet letters B through Z inclusive according to the invention.

FIG. 2 illustrates a plurality 20 of three-dimensional statuettes or figures designated B-Z inclusive which represent human hand figures formed in the remaining twenty-five letters of the manual alphabet. Each statuette includes a base and Braille and English alphabet letter embossments (unnumbered) corresponding to the manual alphabet letter represented thereby. A complete set of twenty-six hand figures A (FIG. 1) and B-Z (FIG. 2) comprises an educational kit for teaching or self-teaching the manual alphabet. Additonal hand figures may be added to the set representing other sign language symbology, including numbers, words and the like.

Figure 3:
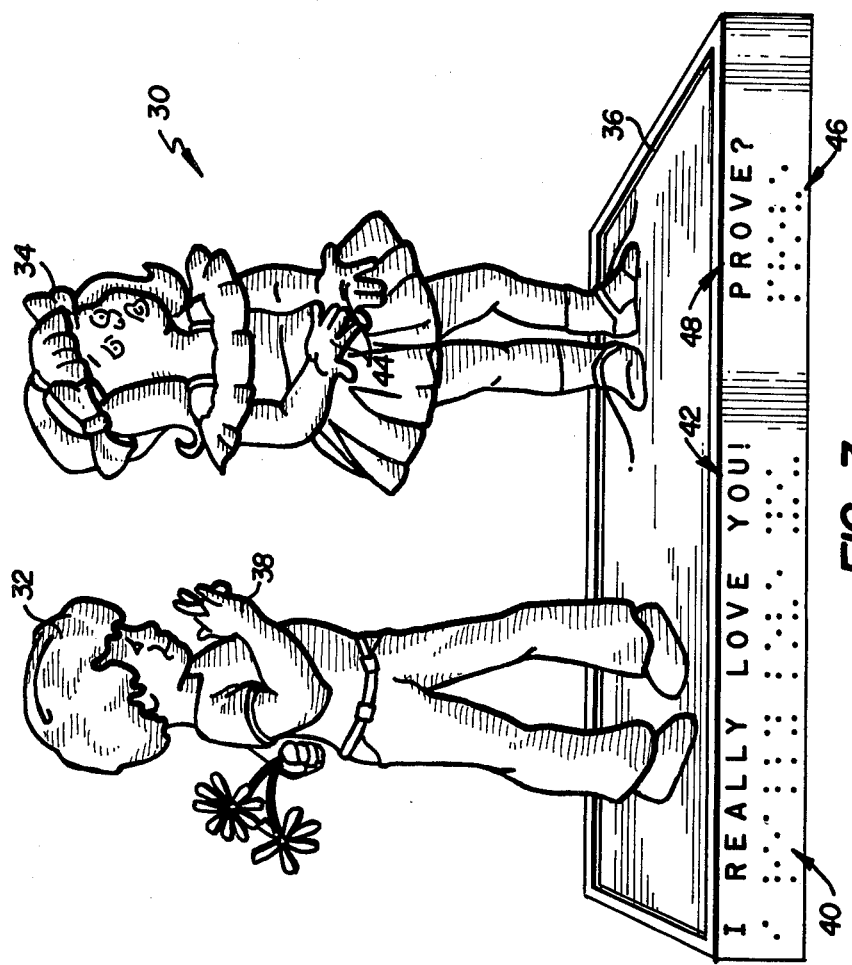
FIG. 3 is a perspective view of an embodiment of the invention illustrating a statuette of a pair of children communicating with each other in sign language.

FIG. 3 illustrates an alternate embodiment of the invention comprising a three-dimensional statuette designated generally by reference numeral 30 and depicting two children, a boy figure 32 and a girl figure 34 on a base portion 36 in the act of communicating with one another in sign language. The right hand 38 of the boy figure is raised in the sign language expression "I REALLY LOVE YOU," which expression is also displayed on the base portion 36 in Braille character embossments 40 and in English words 42. Both hands 44 of the girl figure 34 are extended in the sign language query "PROVE," which is likewise displayed on the base portion 36 in Braille character embossments 46 and in the English word 48.

The embodiment of FIG. 3 is especially useful in communicating feelings, ideas and concepts to the blind and blind-deaf by means of the "body language" of the human figures in combination with the Braille characters.

The three-dimensional figures of the present invention may be cast, molded, sculpted, carved or formed by any conventional technique in any suitable medium or combination of media, including clays, plaster of Paris, metals, synthetic plastics or rubber and the like.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. An educational device, especially for teaching the manual alphabet to the blind and the blind-deaf, comprising a three-dimensional figure representing a human hand positioned to form a given letter of the manual alphabet, said figure including means displaying a Braille character corresponding to said given letter.

2. An educational device according to claim 1, including a plurality of said three-dimensional figures, said figures forming different letters of the manual alphabet, each figure including means displaying the Braille character corresponding to the manual alphabet letter represented thereby.

3. An educational device according to claim 1, wherein said human hand figure includes a wrist portion and a base, said human hand figure being mounted on said base at the wrist portion thereof.

4. An educational device according to claim 3, wherein said Braille character displaying means comprises an embossment located on the wrist portion or the base of said figure.

5. An educational device according to claim 3, including means on said figure displaying the English alphabet letter corresponding to said manual alphabet letter and said Braille character.

6. An educational device according to claim 5, wherein said means displaying the English alphabet letter comprises an embossment of said letter on the base of said figure.

7. An educational device according to claims 1 or 2, wherein each figure is molded from a synthetic plastic material.

8. An educational device, especially for teaching and communicating to the blind and the blind-deaf, comprising a three-dimensional figure representing at least one human being, at least one hand of said human figure being formed in a position of a manual language representation of a letter, word, or words and means on said figure displaying a Braille character or characters corresponding to said manual language representation.

9. An educational device according to claim 8, including means on said figure displaying an English letter, word or words corresponding to said manual language representation and said Braille character or characters.

* * * * *